US011632250B2

(12) United States Patent
Burrows et al.

(10) Patent No.: US 11,632,250 B2
(45) Date of Patent: *Apr. 18, 2023

(54) SIGNATURES OF UPDATES EXCHANGED IN A BINARY DATA SYNCHRONIZATION PROTOCOL

(71) Applicant: Google LLC, Mountain View, CA (US)

(72) Inventors: Michael Burrows, Mountain View, CA (US); Himabindu Pucha, Mountain View, CA (US); Raja Daoud, Mountain View, CA (US); Jatin Lodhia, Mountain View, CA (US); Ankur Taly, Mountain View, CA (US)

(73) Assignee: Google LLC, Mountain View, CA (US)

(*) Notice: Subject to any disclaimer, the term of this patent is extended or adjusted under 35 U.S.C. 154(b) by 216 days.

This patent is subject to a terminal disclaimer.

(21) Appl. No.: 17/184,720

(22) Filed: Feb. 25, 2021

(65) Prior Publication Data

US 2021/0184862 A1    Jun. 17, 2021

Related U.S. Application Data

(60) Continuation of application No. 16/025,139, filed on Jul. 2, 2018, now Pat. No. 10,972,285, which is a
(Continued)

(51) Int. Cl.
*H04L 9/32*       (2006.01)
*G06F 21/64*     (2013.01)
*H04L 9/40*       (2022.01)

(52) U.S. Cl.
CPC ............ *H04L 9/3247* (2013.01); *G06F 21/64* (2013.01); *H04L 63/0442* (2013.01); *G06F 2221/0711* (2013.01); *G06F 2221/2141* (2013.01)

(58) Field of Classification Search
CPC ... H04L 9/3247; H04L 63/0442; G06F 21/64; G06F 2221/0711; G06F 2221/2141
(Continued)

(56) References Cited

U.S. PATENT DOCUMENTS 6,192,366 B1     2/2001  Ogawa
6,470,329 B1 *  10/2002  Livschitz ............ G06F 16/2322
(Continued)

FOREIGN PATENT DOCUMENTS

CN           1897518         1/2007
CN        101395599 A       3/2009
(Continued)

OTHER PUBLICATIONS

International Search Report and Written Opinion dated Dec. 9, 2016, issued in Application PCT/US2016/054871.
(Continued)

*Primary Examiner* — Samson B Lemma
(74) *Attorney, Agent, or Firm* — Lerner David LLP

(57) ABSTRACT

In a distributed system, data is shared between three or more electronic devices. The first device generates and signs an object that includes the data. A second device receives the signed object and determines whether the signed object is valid. If valid, the second device will generate a validated signed object and send it to a third device. The third device will validate the object by determining whether the object includes valid signatures of both the first and second devices.

20 Claims, 6 Drawing Sheets

Related U.S. Application Data division of application No. 15/284,116, filed on Oct. 3, 2016, now Pat. No. 10,038,559.

(60) Provisional application No. 62/236,435, filed on Oct. 2, 2015.

(58) Field of Classification Search
USPC .................................... 713/168, 176; 726/3
See application file for complete search history.

(56) References Cited

U.S. PATENT DOCUMENTS

| | | | |
|---|---|---|---|
| 7,178,029 B2* | 2/2007 | Ansper | H04L 9/3247 |
| | | | 713/181 |
| 7,328,243 B2* | 2/2008 | Yeager | H04L 67/02 |
| | | | 709/248 |
| 7,701,953 B2 | 4/2010 | Chen et al. | |
| 7,949,606 B1 | 5/2011 | Sweet | |
| 8,375,216 B2 | 2/2013 | Mizuno | |
| 8,527,461 B2 | 9/2013 | Ducott, III et al. | |
| 9,077,759 B2 | 7/2015 | Brouwer et al. | |
| 9,276,749 B2* | 3/2016 | Tenenboym | H04L 63/0876 |
| 9,800,416 B2 | 10/2017 | Tenenboym et al. | |
| 10,204,178 B2* | 2/2019 | Wegner | G06F 3/1212 |
| 2002/0009165 A1* | 1/2002 | Friedman | H04J 3/0608 |
| | | | 375/340 |
| 2003/0120665 A1 | 6/2003 | Fox et al. | |
| 2003/0196090 A1* | 10/2003 | Nagahama | H04L 9/3263 |
| | | | 713/176 |
| 2004/0088646 A1* | 5/2004 | Yeager | H04L 67/104 |
| | | | 715/255 |
| 2006/0174204 A1 | 8/2006 | Jung et al. | |
| 2008/0005188 A1 | 1/2008 | Li et al. | |
| 2008/0021720 A1 | 1/2008 | Glinberg | |
| 2009/0006642 A1* | 1/2009 | Dickens | H04L 65/611 |
| | | | 709/231 |
| 2009/0217047 A1* | 8/2009 | Akashika | G06F 21/33 |
| | | | 713/175 |
| 2011/0004636 A1 | 1/2011 | Parkkinen et al. | |
| 2011/0110568 A1 | 5/2011 | Vesper et al. | |
| 2011/0179089 A1 | 7/2011 | Idicula et al. | |
| 2012/0190386 A1 | 7/2012 | Anderson | |
| 2013/0013648 A1 | 1/2013 | Monjas Llorente et al. | |
| 2013/0268764 A1 | 10/2013 | Valdes et al. | |
| 2014/0040611 A1* | 2/2014 | Tenenboym | H04L 9/3297 |
| | | | 713/157 |
| 2014/0189762 A1 | 7/2014 | Hainline | |
| 2014/0215574 A1 | 7/2014 | Erb et al. | |
| 2015/0019982 A1 | 1/2015 | Petitt, Jr. et al. | |
| 2015/0127610 A1 | 5/2015 | Besen et al. | |
| 2015/0127733 A1 | 5/2015 | Ding et al. | |
| 2015/0163206 A1* | 6/2015 | McCarthy | H04L 63/104 |
| | | | 726/4 |
| 2015/0281353 A1 | 10/2015 | Mahkovec et al. | |
| 2015/0310188 A1 | 10/2015 | Ford et al. | |
| 2015/0350308 A1 | 12/2015 | Cosentino et al. | |
| 2016/0037215 A1 | 2/2016 | Cardona | |
| 2016/0099963 A1 | 4/2016 | Mahaffey et al. | |
| 2016/0188706 A1 | 6/2016 | Momosaki et al. | |
| 2016/0191608 A1 | 6/2016 | Zaid et al. | |
| 2017/0235970 A1* | 8/2017 | Conner | G06F 16/2358 |
| | | | 707/690 |

FOREIGN PATENT DOCUMENTS

| | | | |
|---|---|---|---|
| CN | 101964789 A | 2/2011 | |
| EP | 0872080 A1 | 10/1998 | |

OTHER PUBLICATIONS

International Search Report and Written Opinion dated Dec. 6, 2016, issued in Application PCT/US2016/054895.

"Syncbase Syncing Data", as published <https://vanadium.github.io/syncbase/guides/synchranization.html>, retrieved from the Internet Sep. 5, 2016.

Introduction to Microsoft Sync Framework File Synchronization Provider (Oct. 2009).

FileSync/NDN: Peer-to-Peer File Sync over Named Data Networking (Mar. 2013).

Database Concepts, Tables and Table Clusters, https://docs.oracle.com/database/121/CNCPT/tablecls.htm#i25478, downloaded from internet Oct. 29, 2015.

Database SQL Tuning Guide, Guidelines for Indexes and Table Clusters, https://docs.oracle.com/database/121/TGSQUtgsql_indcl.htm#TGSQL870, downloaded from internet Oct. 29, 2015.

Database Administrator's Guide, Creating Clusters, <http://docs.oracle.com/cd/B2835901/server.111/b28310/clustrs003.htm>, downloaded from internet Oct. 29, 2015.

Corbett et al., Spanner: Google's Globally-Distributed Database, published in the Proceedings of OSDI 2012, http://static.googleusercontent.com/media/research.google.com/en//archive/spanner-osdi2012.pdf.

U.S. Appl. No. 14/927,591, filed Oct. 30, 2015.

U.S. Appl. No. 15/284,078, filed Oct. 3, 2016.

U.S. Appl. No. 15/284,116, filed Oct. 3, 2016.

Information about Related Patents and Patent Applications, see section 6 of the accompanying Information Disclosure Statement Letter, which concerns Related Patents and Patent Applications.

International Search Report and Written Opinion dated Jan. 3, 2017, issued in Application No. PCT/US2016/054859.

Sandhu R.S. et al., "Access Control: principle and practice", IEEE Communications Magazine, IEEE Service Center, Piscataway, US, vol. 32, No. 9, Sep. 1, 1994, pp. 40-48.

International Preliminary Report on Patentability dated Apr. 12, 2018, for International Application No. PCT/US2016/054859. 7 pages.

International Preliminary Report on Patentability dated Apr. 12, 2018, for International Application No. PCT/US2016/054871. 7 pages.

International Preliminary Report on Patentability dated Apr. 12, 2018, for International Patent Application No. PCT/US2016/054895. 8 pages.

Office action issued in Chinese patent application 201680059104.7, dated Jan. 24, 2019, 5 pages.

English Translation of Office action issued in Chinese patent application 201680059104.7, dated Jan. 24, 2019, 7 pages.

Extended European Search Report for European Patent Application No. 19180197.6 dated Sep. 27, 2019. 6 pages.

Anonymous: "Version vector—Wikipedia", Jun. 13, 2015 (Jun. 13, 2015), XP055626804. 2 pages. Retrieved from the Internet: URL: https://en.wikipedia.org/w/index.php?title=Version_vector&oldid=666811850.

Anonymous: "Wireless ad hoc network—Wikipedia", Sep. 27, 2015 (Sep. 27, 2015), XP055631350. 6 pages. Retrieved from the Internet: URL: https://en.wikipedia.org/w/index.php?title=Wireless_ad_hoc_network&oldid=682978409.

E-mail Opinion on European Patent Application No. 16781634.7. Oct. 15, 2019. 4 pages.

Office Action for Chinese Patent Application No. 201910991911.8 dated Dec. 22, 2022. 9 pages.

Office Action for European Patent Application No. 19180197.6 dated Jan. 10, 2023. 6 pages.

English Translation of Office Action for Chinese Patent Application No. 201910991911.8 dated Dec. 22, 2022. 14 pages.

* cited by examiner

SIGNATURES OF UPDATES EXCHANGED IN A BINARY DATA SYNCHRONIZATION PROTOCOL

RELATED APPLICATIONS AND CLAIM OF PRIORITY

The present application is a continuation of U.S. patent application Ser. No. 16/025,139, filed Jul. 2, 2018, which is a divisional of U.S. patent application Ser. No. 15/284,116, filed Oct. 3, 2016, now U.S. Pat. No. 10,038,559, which claims priority to U.S. provisional patent application No. 62/236,435, filed Oct. 2, 2015, the disclosures of which are fully incorporated into this document by reference.

BACKGROUND

This disclosure describes mechanisms for identification, authentication, and authorization of communications between two or more electronic devices.

When electronic devices such as mobile electronic devices and servers engage in communication via a network, and in particular when they share objects and multiple entities have permission to update objects, errors can occur if the devices do not understand when authorized updates have been made.

This document describes methods and devices that are directed to improving authentication and/or authorization in distributed systems of electronic devices.

SUMMARY

In various aspects, a system implements a method of controlling sharing updates to an object between entities in a distributed system. For example, a sync group may include multiple electronic devices. A first electronic device of the group generates an object, signs the object and transmits the signed object to a second electronic device of the group. The second electronic device receives the signed object, determines whether the signed object is valid and, upon determining that the signed object is valid, generates a validated signed object and transmits the validated signed object to a third electronic device of the group. The third electronic device receives the validated signed object from the second device, determines whether the validated signed object includes valid signatures of both the first device and the second device, and it only further distributes or uses the update if it finds the valid signatures in the validated signed object.

Optionally, when generating the object and signing the object to create the signed object, the first electronic device may grant a blessing to a storage service of the first electronic device, create the object with the data and the blessing, and apply a signature to the object to yield the signed object.

Optionally, when determining whether the signed object is valid, the second electronic device may: (i) verify whether a remote end of a remote procedure call associated with the signed object is authorized by an access control list for the data; (ii) verify that the remote end of the remote procedure call includes a public key of the first electronic device; and (iii) use the public key of the first electronic device to verify the signature of the signed object.

Optionally, when determining whether the signed object is valid, the second electronic device may extract one or more blessing names from a blessing of the signed object, and the second electronic device may verify that the extracted one or more blessing names satisfy the access control list.

Optionally, when creating the validated signed object, the second electronic device, creating the validated signed object to include: (i) the signed object; (ii) one or more blessing names extracted from the signed object; (iii) a public key of the second electronic device; and (iv) a signature of the second electronic device.

Optionally, when determining whether the validated signed object includes the valid signature of the first electronic device and the valid signature of the second electronic device, the third electronic device may determine that the validated signed object includes the valid signature of the first electronic device but not the valid signature of the second electronic device. If so, the third electronic device may require the second electronic device to provide an updated validated signed object with the valid signature of the second electronic device.

Optionally, when determining whether the validated signed object includes the valid signature of the first electronic device and the valid signature of the second electronic device, the third electronic device may determine that the validated signed object includes the valid signature of the second electronic device but not the valid signature of the first electronic device. If so, the third electronic device may either ignore the validated signed object or require the second electronic device to obtain a valid signature of the first electronic device for the validated signed object.

Optionally, either the second electronic device or the third electronic device may: receive a batch that includes a plurality of updated objects; determine whether any row in the batch is in conflict due to a difference between a local version and a remote version of the row; and add any row that is determined to be in conflict to a closure.

Optionally, the second electronic device or the third electronic device may: (i) receive an entry that includes the signed object or the validated signed object; (ii) determine whether a lookup key for the entry ends in a value that matches a cryptographic hash of a corresponding entry that is stored in a data store; and (iii) only accept the entry if the lookup key for the entry ends in the value, otherwise reject the entry. In some embodiments, the value may include a public key and a sequence number. In some other embodiments, the value may include: (a) a blessing pattern of the first device; (b) a blessing pattern of a trusted re-signer; (c) a sequence number; and (d) a signature of the first device.

Optionally, the second electronic device or the third electronic device may: (i) receive an entry that includes the signed object or the validated signed object; (ii) determine whether a lookup key for the entry includes a blessing pattern of a trusted re-signer; and (iii) only accept the entry if the lookup key for the entry includes the blessing pattern of the trusted re-signer, otherwise reject the entry.

In another aspect, to validate an object shared between electronic devices in a distributed system, a third electronic device of a sync group that includes at least a first electronic device, a second electronic device and the third electronic device will implement a method that includes receiving an object, and determining whether the received object is a validated signed object by determining whether the object includes a valid signature of the first electronic device and a valid signature of the second electronic device. If the received object includes the valid signature of the first electronic device and the valid signature of the second electronic device, the third electronic device will send the received object to an additional device associated with the sync group, otherwise it will not send or use the received object.

Optionally, in the system of the previous paragraph, when determining whether the validated signed object includes the valid signature of the first electronic device and the valid signature of the second electronic device, the third electronic device will determine that the validated signed object includes the valid signature of the first electronic device but not the valid signature of the second electronic device. If so, the third electronic device may require the second electronic device to provide an updated validated signed object with the valid signature of the second electronic device.

Optionally, in this aspect, when determining whether the validated signed object includes the valid signature of the first electronic device and the valid signature of the second electronic device, the third electronic device may determine that the validated signed object includes the valid signature of the second electronic device but not the valid signature of the first electronic device. If so, the third electronic device may require the second electronic device to validate a signature of the first electronic device in the validated signed object.

In another aspect, a second electronic device of a sync group that includes at least a first electronic device, the second electronic device and a third electronic device may validate a signed object that is shared between the devices by receiving the signed object and determining whether the signed object is valid. Upon determining that the signed object is valid, the second electronic device may create a validated signed object that includes a signature of the second electronic device. The second electronic device may then transmit the validated signed object to the third electronic device that is associated with the sync group.

Optionally, in this aspect, when determining whether the signed object is valid comprises, the second electronic device may: (i) verify whether a remote end of a remote procedure call associated with the signed object is authorized by an access control list for the data; (ii) verify that the remote end of the remote procedure call includes a public key of the first electronic device; and (iii) use the public key of the first electronic device to verify the signature of the signed object.

Optionally, in this aspect, when determining whether the signed object is valid, the second electronic device may extract one or more blessing names from a blessing of the signed object. The second electronic device may also verify that the extracted one or more blessing names satisfy the access control list.

Optionally, in this aspect, the second electronic device may create the validated signed object to include: (i) the signed object; (ii) one or more blessing names extracted from the signed object; (iii) a public key of the second electronic device; and (iv) the signature of the second electronic device.

DETAILED DESCRIPTION

Figure 1:
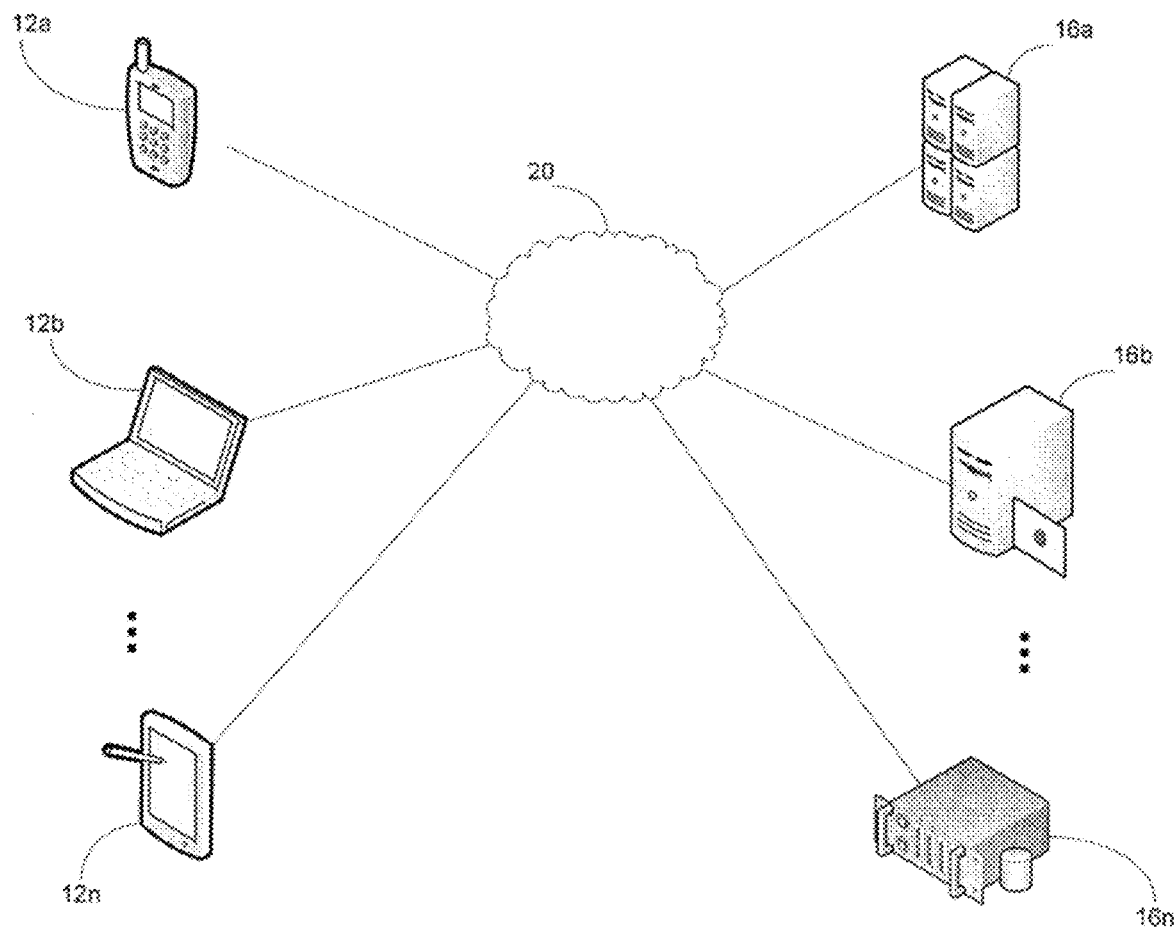
FIG. 1 illustrates an example of a distributed system that includes various client devices and servers according to various embodiments.

Terminology that is relevant to this disclosure includes:

An "electronic device" or a "computing device" refers to a device that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are each electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity.

In this document, the terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

An "object" is a process, data set, or other resource, function or transaction for which a server controls access by authorized client devices, and which may be updated by one or more authorized client devices.

The process of identifying and/or verifying a device or its user may be referred to as "authentication." The process of identifying what actions or services one or more devices or users may perform or use may be referred to as "authorization."

A "principal" is an entity (i.e., an electronic device, or in the case of a user an electronic device that is being used by a particular user) that issues a request. A principal has an identity and can be identified by a name and/or a key.

A "blessing" is a set of cryptographic or other electronically presented credentials for a principal. It attests to an entity's ability to wield some authority. Optionally, a blessing may contain one or more human-readable names that may be referred to as a "blessing name." For simplicity, this document may use the abbreviated term "blessing" to also refer to a blessing name where the meaning is clear based on the context.

A "human-readable name" is a representation of data that can naturally be read and understood by humans, such as one made up of characters of the English or other human language, optionally with one or more symbols having meaning that is understood by a human. Examples include a person's name, an email address which contains the @ symbol representing "at", or the like.

The term "sync group" is intended to refer to a group of devices that are permitted to synchronize a set of data between each other and/or to a data storage facility.

An "access control list" or "ACL" is a list, table or other data structure that identifies the permissions that are attached to a particular object or set of objects. The permissions may involve a single device or multiple devices.

As used in this document, the singular forms "a," "an," and "the" include plural references unless the context clearly dictates otherwise. Unless defined otherwise, all technical and scientific terms used herein have the same meanings as commonly understood by one of ordinary skill in the art.

As used in this document, the term "comprising" means "including, but not limited to."

FIG. 1 illustrates various embodiments of a distributed system in which one or more client devices $12a \ldots 12n$ communicate with one or more other electronic devices such as servers $16a \ldots 16n$ via one or more communication networks 20 such as a wireless phone network, the Internet, an intranet, a local area network, a wide area network, another type of network, or any combination of these. Any of the servers $16a \ldots 16n$ may be used to make one or more objects available to authorized client devices. In addition, one or more of the servers (e.g., 16b) may act as a certificate server or otherwise store access credentials such as encryption keys for any of the client devices $12a \ldots 12n$ in a structure such as an access control list. Any of the servers 16n also may be a group server that stores details of one or more groups, such as lists of group members. In addition, any client device (e.g., 12a) may delegate its authority to access various objects to one or more of the other client devices (e.g., 12b).

In this document, the client devices may be divided into sync groups that can synchronize objects or sets of objects between them. Any particular device may be associated with one or more sync groups. The devices in each sync group will store an ACL or other data structure that identifies the other devices that are members of the sync group. (Note: in this context, the term "device" may refer to an actual electronic device identifier, or to an identifier of a user who is using a particular electronic device.)

This document describes a scheme for signing objects and verifying object signatures for objects that may be exchanged between devices during a synchronization protocol. The procedures described in this document may enable objects exchanged between devices to exhibit integrity, authenticity and consistency. The feature of integrity means that a system can determine if the object has been tampered with since it was first transmitted by its author. The feature of authenticity means that the system can determine the blessing names of the original device that authored the object. The feature of consistency means that if an object is considered to be valid by one system, then it can be considered to be valid by other systems that implement the processes described in this document.

Figure 2:
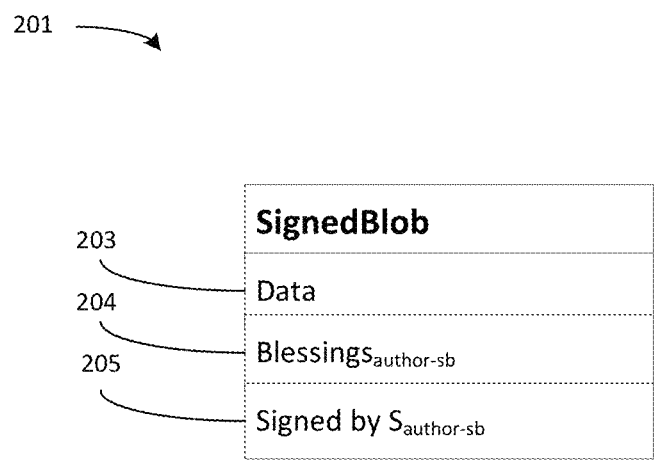
FIG. 2 illustrates example elements of a signed object with data that will be shared between devices of a distributed system.

This document also describes several actions in which a device or service may determine whether an object is valid. Without limiting the disclosure, one method by which a determination of validity may occur involves: (i) checking a hash being signed to confirm that the hash matches the data; (ii) confirming that the signature is tied to a first device via a sequence of certificates, all of which have hashes that match their respective contents; (iii) confirming that each successive certificate being signed after the first certificate of the string of certificates is signed by the public key mentioned in the previous certificate in the string; (iv) confirming that the first certificate is signed by a key listed in a trusted root set of a second device; and that none of the keys, signatures and certificates in the string have expired, and that none of the keys has been revoked This document describes steps that may be involved in signing objects (which it may refer to by way of example as binary large objects, or "blobs," although it is not necessary that the objects be binary large objects). This document also describes steps for processing the signed objects to authenticate them and establish their integrity and authenticity. An example of a blob is shown in FIG. 2, in which a signed blob (denoted by "sb") 201 is a data structure having the elements of data 203, one or more blessings 204, and a signature 205. Data 203 is the object (i.e., the data) that is being synced, and it may include information such as a sequence number for replay protection and sync-related metadata. Blessings$_{author\text{-}sb}$ are blessings 204 bound to the system or device that authored the object. The authoring system typically obtains these blessings from the device on behalf of which it is syncing data. The system generates a signature 205 using its private key ($S_{author\text{-}sb}$). In the discussion below, for a signed object "sb", the discussion may use the phrases data(sb), blessings(sb) and signature(sb) to refer to the data, blessing and signature components of a signed object such as the one shown in FIG. 2. The discussion below may also use the term AuthorPublicKey(sb) to refer to the public key of blessing(sb), which is also the public key of the author of the signed object.

In this system, entities (i.e., devices) sign their updates whenever they update an object. This allows a first device X to update some data, and pass it to a second device Y. Device Y may be allowed to see the data, but not modify it. Device Y in turn passes it to a third device Z. Device Z receives the update from device Y, which was not permitted to make the update, but Z can tell that the update was originally authored by device X, which did have permission. Thus, device Z can apply the update, knowing the security was not violated.

An issue may arise if an entity's authority to update an object was revoked during update propagation. For example, if in the situation described above device X was reported stolen after the update was transferred to device Y, but before the update was transferred from Y to device Z, device Z may receive the authorized update that was generated by device X. However, when device Z naively checks whether the update is authorized, it may learn that device X's credentials are no longer valid (because the device was reported stolen), and so it will reject the update. Since device Y accepted the update, this results in a conflict, and the data on various devices may diverge.

In the present embodiments, the system will use a second signature, added by device Y, to validate the update and allow the update to continue to propagate through the sync group. Device Y may thus create a validated signed object.

Figure 3:
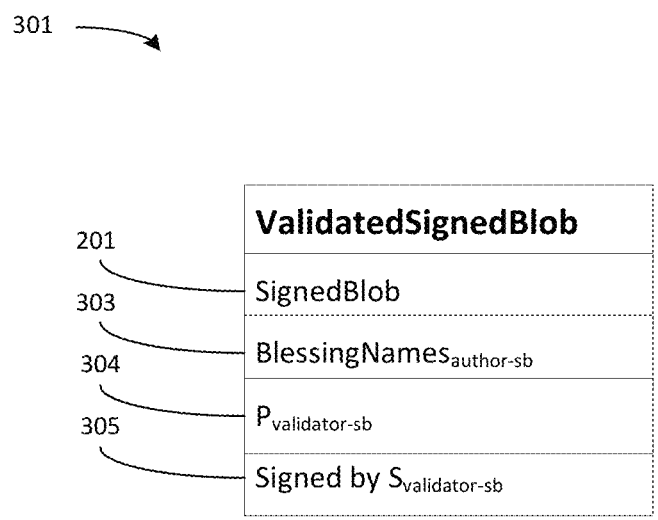
FIG. 3 illustrates example elements of a validated signed object.

FIG. 3 illustrates an example data structure of a validated signed object 301, which includes the original signed object 201. Validated signed object 301 also includes BlessingNames$_{author\text{-}sb}$ which are the blessing names 303 of the author of the signed object 201 as determined by the validator. The validator may obtain this by validating the blessings encapsulated within the signed object 201 in the security context under which the signed object 201 was originally received by the validator's system. Validated signed object 301 also includes P$_{validator\text{-}sb}$, which is the public key of the validator system, as well as a signature 305 that is generated by the validator system using its private key (S$_{validator\text{-}sb}$). In the discussion below, for a signed object "sb", the discussion may use the phrases data(vsb), blessingsNames(vsb), validatorPublicKey(vsb) and signature (vsb) to refer to the data, blessing names public key and signature components of a validated signed object such as the one shown in FIG. 3.

Below are some descriptive comments from an example implementation of the embodiment described above:

The system signs object updates using public key signatures, and allows these signatures to be checked on other nodes. It has two operations: Sign( ) and Check( ). They operate on a DataWithSignature type, which includes Data (the data to be signed), which in turn is a vector of Items, which are arbitrary data items. The functionality may be useful synchronization of data across a sync group because it may allow a signature to remain valid during its propagation across the sync group once it has been accepted by at least one member of the sync group, even if the original key or its blessings are invalidated in the meantime.

There may be three types of participants: (1) an "author", which creates an update, and signs it with the Sign( ) operation; (2) one or more "validators", each of which receives a change directly from the author, and applies the Check( ) operation to validate it; and (3) zero or more "checkers', each of whom receives a change from a validator or another checker, and applied Check( ) to check it.

A validator checks the signature and blessings provided by the author, and then the validator appends its own signature, creating a validated signed object vouching for the fact that the author's signature was good at the time the validator saw it.

A checker checks the signatures of both the author and validator but uses weaker checks for signature validity than a validator. In particular, it uses a significant grace period for key expiry so that a change admitted to the sync group by a validator has an opportunity to propagate to all the nodes in the sync group if the keys or blessings are revoked after the change is admitted, but before it is fully propagated. The intent may be that a grace period be chosen to be greater than the diameter of the sync group (measured in time). One way to ensure that is to insist that members sync with a central server at least every T time units, and make the grace period be 2T or some other multiple or function of T. The central server may sign the data anew to allow new members to pick it up.

An update written to the system might be quite small (perhaps tens of bytes), but a public key signature or verification can take on the order of millisecond (which is actually quite large). A checker performs two such verifications. To address this and reduce performance issues, the system may batch object updates so that a single signature check applies to several updates. Thus the Data in a DataWithSignature may be a vector of Item, rather than a single Item.

However, the system will not always wish to put all updates in the same batch. For example, an author and a validator might share two different sync groups with different memberships. In such a case, the author might keep the batches for one sync group separate from batches for the other sync group, even though author's blessings and validator identities are the same for all the batches. Thus, the system may decouple the author's blessings data and the validator's key data separately from the signed batches itself, so that the blessings and validator data can be processed once, even though several batches of updates are being sent.

A ValidationCache may be used to hold this data separately, and allow it to be sent just once, rather than once per signature.

As a final example, if the author sends a batch of (e.g., 10) updates to a validator and the validator then syncs with a checker that is permitted to see only half of the updates; perhaps ACLs prevent it from seeing the others. This requires that the signature on the batch remain valid even if some of the updates in the batch are removed. This may be accomplished via the Item type, which is a data encoding scheme union type that contains either the bytes of the marshalled form of the update, or (if the update must not be sent) the SHA-256 (or other) hash of the data (which can be computed with SumByteVectorWithLength( )).

Figure 4:
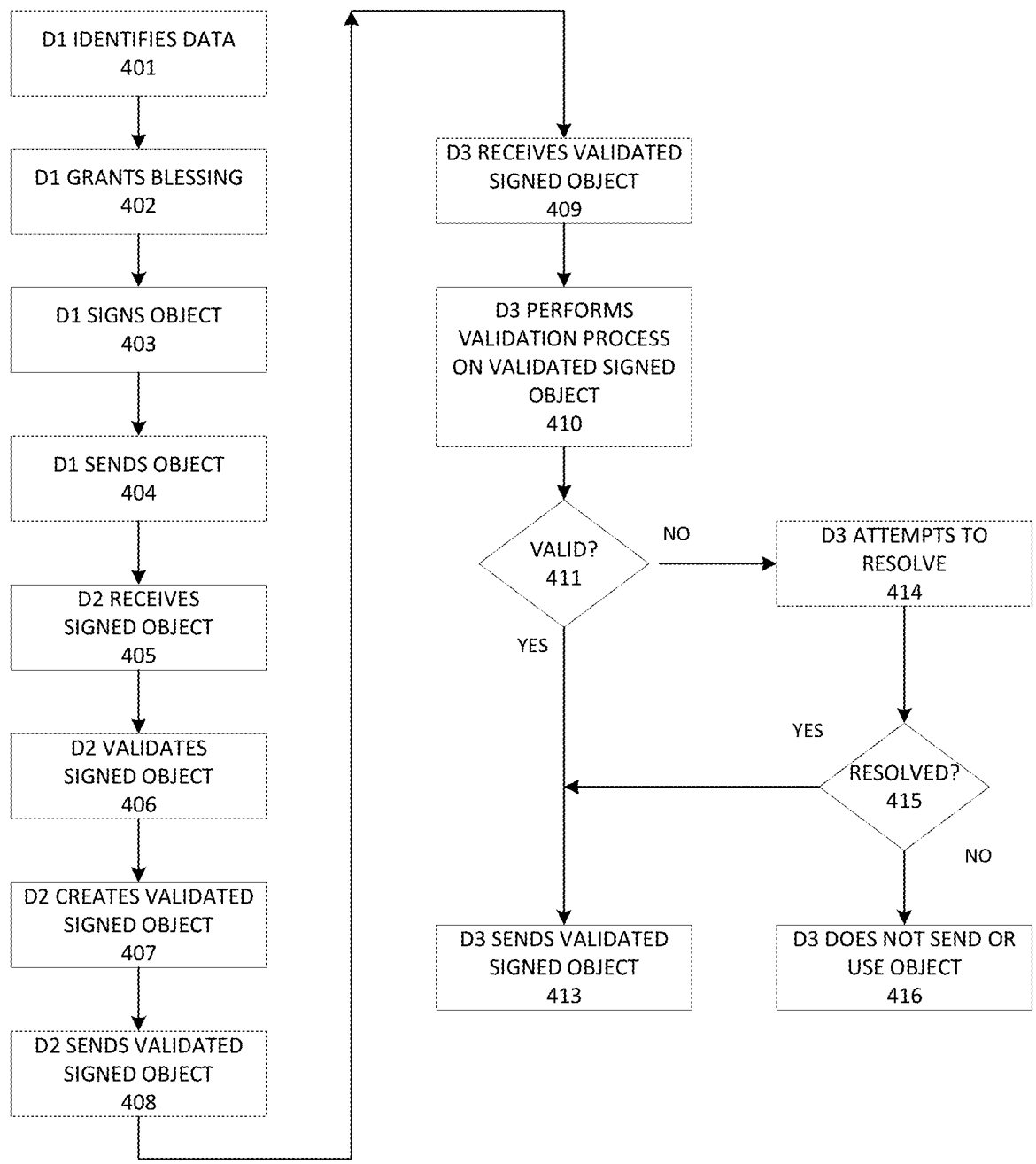
FIG. 4 illustrates an example object validation process in a distributed system.

FIG. 4 is a flow diagram illustrating a process of implementing the embodiments described above. A first device (D1) executes an application that identifies data 401 to synchronize some data within a sync group will grant a blessing 402 to a storage service (such as a Syncbase) of the first device, which is a key-value storage system that handles structured data and/or objects such as blobs. The first device's storage service agent will create a signed object 403 with the data, the granted blessing(s) and a signature using its private key. The signed object may be a new object or an update to a previously-created object. The first device's storage service agent will then transmit the signed object 404 to one or more other devices to synchronize the created signed object with other devices in the sync group.

A storage service agent of a second device (D2) will receive a signed object 405 and act as a validator by validating the signed object 406, i.e., by determining whether the signed object is valid. It may validate the signed object 406 by: (i) verifying that the remote end of the remote procedure call (RPC) that arrived with the signed object is authorized by the relevant sync ACLs; (ii) verifying that the remote end of the RPC has the public key of the author authorPublicKey(sb), to ensure that the author of the signed object is the one making the RPC to sync it; (iii) verifying the signature of the signed object signature(sb) using the authorPublicKey(sb); (iv) validating the blessings(sb) in the context of the remote procedure call on which the signed object was received and extracting the blessing names for the blessings (denoted by blessingNames$_{author\text{-}sb}$); and (v) verifying that the blessingNames$_{author\text{-}sb}$ satisfy the relevant ACLs for the data(sb). Upon validating the signed object 406, the second device can be sure that the signed object has integrity and was authored by a storage service agent that is authorized by the relevant ACL.

Upon validating the signed object, the second device will create a validated signed object 407 and propagate the validated signed object by transmitting 408 it to one or more additional devices in the sync group. To create the validated signed object 407, the second device will include the signed object, the blessingNames$_{author\text{-}sb}$, its own public key, and a signature signature(vsb) over these items using its private key.

When a third device in the sync group receives the validated signed object 409, the third device may perform a validation process on the received object 410 by determining whether the validated signed object includes valid signatures for both the author (first device) and the second device. The third device may do this by (i) verifying that the remote end of the remote procedure call (RPC) that arrived with the validated signed object is authorized by the relevant sync ACLs; (ii) verifying the validatorPublicKey(vsb) is not equal to the authorPublicKey(sb), to ensure that the object was not validated by the original author; (iii) checking to ensure that the validatorPublicKey(vsb) and authorPublicKey(sb) have not expired beyond any expiration threshold plus any applicable grace period, such as by consulting certificate revocation list obtained from the sync group's server (note: this action may be done by the second device as part of validating the blessings, as described above); (iv) verifying the first device's signature on the signed object within the validated signed object using the authorPublicKey(sb); (v) verifying that the blessingNames(vsb) are a subset of the blessing names encapsulated within the blessings(sb); and also (vi) verifying that the blessingNames(vsb) satisfy the relevant ACLs or the data in the object.

If the third device determines that the validated signed object is valid (411 YES), it may then further send the object to other devices in the sync group, optionally by creating an updated version of the validated signed object with its own signature. If the third device cannot determine that the validated signed object is valid (411 NO), then it may attempt to resolve the validation issue 414. For example, if the signature of the first device (signature(sb)) is not valid, the third device may require the second device to obtain the signature of the first device, otherwise it may ignore the validated signed object. If the signature of the second device (signature(vsb)) is not valid, the third device may require the second device to provide an updated validated signed object with a valid signature(vsb). The third device will only further propagate the update if it can resolve the validation issue (415 YES). Otherwise (415 NO), it will not further distribute or use the object 416.

In some embodiments, one or more devices and their installed applications may generate objects and/or perform updates to objects in batches, which may be applied locally in a data store. A batch includes one or more rows of objects written atomically to a synchronized system with some invariant relationships between the rows. A row is considered to be in conflict if it has been independently modified by two devices at times such that each device modified the row at a time when it did not have information indicating that the other device also modified the row. The conflict is detected during cross-device synchronization when either of the devices or another device becomes aware of both modifications. The device that discovers the conflict will, if its permissions allow, try to resolve the conflict by choosing between the modifications, or by combining them in some way into one new modification. Conflicts interact with batches because the system must resolve the conflicts while allowing batches to appear to happen atomically. If one row within a batch is under conflict, then the whole batch may be considered to be under conflict.

In addition, if row P in batch B1 is under conflict with batch B2, while row Q in batch B1 is under conflict with batch B3, then the group of three batches {B1, B2, B3} is under conflict together. The conflict resolution algorithm creates a closure of batches that are in conflict together, where no batch outside the closure is in conflict with a batch inside.

The system may stream the whole closure as a single conflict call to the device application that is using the storage service for resolution.

A row under conflict may have two versions: (1) local (the version previously known locally to the device), and (2) remote (the version obtained from another device via the sync protocol).

Figure 5:
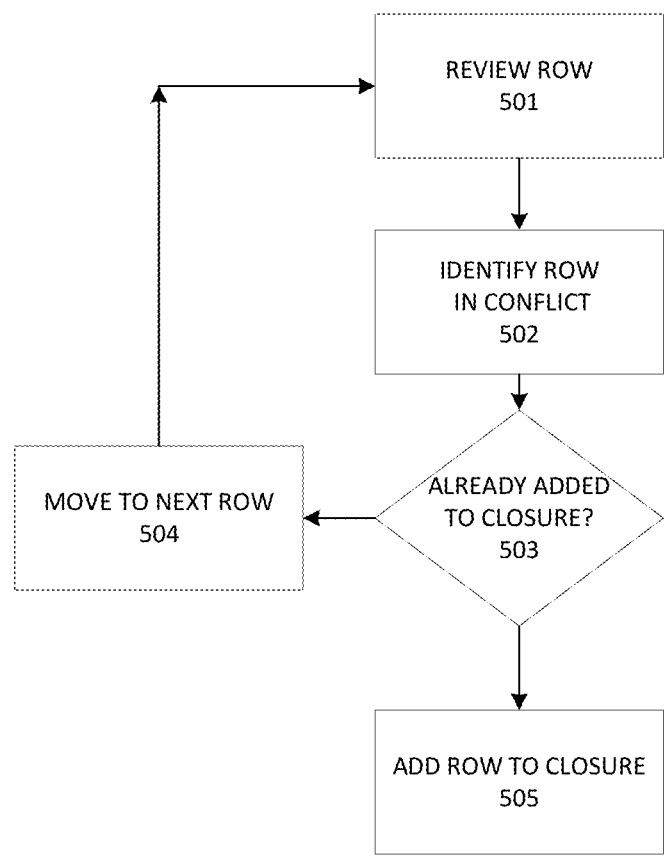
FIG. 5 illustrates an example of a process of resolving conflicts when object updates are received in batches.

To find the closure of batches the system may implement a process such as that shown in FIG. 5. The system will review each row to determine whether it is under conflict 501. A row is in conflict if there is a local version and a different remote version for the row, and those versions can be part of a local batch and a remote batch. When the system identifies a row that is in conflict 502, the system will try to create a closure for it. If the row in conflict has already been added to a previously created closure (503 YES), then the system may skip it (i.e., do nothing further with that row) and move to the next row 504. If it has not been added to a previous closure the system may create a closure 505 for the row. Creating a closure 505 for a row involves adding the row to the closure, finding the local and remote batches to which the row belongs to and adding all rows that belong to these batches to the closure. If the new rows are themselves under conflict, then the system may recursively process each of these rows as mentioned above by adding more batches to the closure. If a batch has already been seen, then the system may skip processing it. In the end, the collection of rows given as input will be grouped into non-intersecting closures, each containing batches of rows that are in conflict amongst each other but not with any batch outside the closure.

Once a closure of a conflicting batch has been identified, the device must determine whether it is permitted to resolve the conflict. The device may not be permitted to resolve the conflict if such a resolution would require it to write a new value to a row, and it does not have permission to do so. If the device does have permission to resolve the conflict, the parameters or client settings of the storage service agent indicate which conflict resolution algorithm to use. The algorithm may be simple, such as picking the update with the most recent timestamp. In a more complex embodiment, the system may give the relevant update batches (along with the data values before any of the changes) to the application program, which may choose what to write to the rows using application-dependent rules. If the device is not permitted to resolve the conflict, it instead may keep all of the various changes in memory, but not make the changes visible to the application. The changes will eventually propagate (via this device or others) to some device that does have permission to resolve the conflict. The resolved values are then propagated to other devices. Sync groups may be configured so that at least one device (such as a server device) has permission to resolve the conflict.

By way of example, consider the following scenario:
(a) A first device D1 writes a group of rows {X, Y} as part of Batch B1.
(b) The first device D1 writes a group of rows {Z, A} as part of Batch B2.
(c) The first device D1 writes a group of rows {p, q} as part of Batch B3.
(d) A second device D2 writes rows {Y, Z} as part of Batch B4.
(e) The second device writes rows {p, q} as part of Batch B5.

Assume that device D1 is a local device receiving updates from device D2. The rows that are in conflict will be Y, Z, p and q. Rows X and A are not in conflict in this example. The system would create two closures for this situation, leading to two separate conflict resolution calls as follows:

(1) Since B1 and B4 conflict with each other over Y, and B2 and B4 conflict over Z, the following closure is formed: {X(B1), Y(B1, B4), Z(B2, B4), A(B4)}.

Since B3 and B5 conflict with each other over p and q the following closure is formed: {p(B3, B5), q(B3, B5)}.

In a further embodiment, the system may include processes that limit writing of new objects or updating existing objects according to specified protocols. Such processes can enable a system to use less detailed ACLs, or in some embodiments no ACLs at all. In the processes described above, signatures can serve at least two purposes: (1) to allow convergence of correct storage service agent implementations within a sync group in the face of potentially malicious storage service agents; and (2) to allow applications to control which devices may write an update, and to where the update may be written. The processes described in the following discussion enable a third purpose: to allow applications to discover what device has written an update, and where the update was written.

In this option, keys may be used to handle convergence. Read-write member devices of a sync group may sign the objects that they sync to other devices, and read-only members may transmit these signatures unchanged. The signatures may have time-outs that last longer than a time diameter associated with the sync group. The time diameter may be a maximum time that it takes data to get from an author to any other device member of the sync group.

In systems such as those described above, support for limited permissions may be added without the need for additional signatures. This may be done by adding lookup keys to each entry in a storage service agent with any of the following options: (1) an immutable entry; (2) an unauthenticated, single-writer entry; (3) an authenticated, single-writer entry; (4) an access-controlled entry. There is no requirement that a system include all of these options or any of these options; any of them may or may not be implemented in any system design.

Immutable entries.

The first option, an immutable entry, is a value that can be written once, by any device, but never changed or deleted. With this option, the system would consider an entry (i.e., an object in the storage service agent) to be immutable if it has a lookup key that ends in "$hash=<hash_of_value>$", where "<hash_of_value>" is a cryptographic hash of the value stored in the entry. The system would refuse to delete such entries, and refuse to overwrite them unless the value had the specified hash, thus ensuring that the value did not change. These checks would be performed by each device in the system, so that a malicious system that attempted to change or remove an object would not be believed.

In some embodiments, the programming for resolving the conflict may be configured to cause the system to resolve all conflicts on such entries immediately by picking one of the values arbitrarily, since all legal values will be equal. Optionally, if the value to be stored is significantly smaller than the hash, the system may store the value rather than its hash in the lookup key.

With this option, an application instance wishing to write an entry (<lookup_key>, <value>) would instead write (<lookup_key_prefix>$hash=<hash_of_value>$, <value>). Clients that wish to lookup the value without knowing the hash would scan a data set to find any such lookup keys.

With this option, unauthorized devices would not be able to overwrite or delete a legitimate entry.

Unauthenticated, single-writer entries.

The second option, unauthenticated, single-writer entries, are values that can be written by sync group members that are given write access, but that otherwise are not authenticated. The original writer of an entry can write it as many times as desired. This technique builds on immutable entries by adding an extra condition allowing modification by the first writer of an entry.

With this option, the system may accept entries whose lookup keys end in "$hash=<hash_of_value>$" where "<hash_of_value>" is a cryptographic hash of the first value stored in a corresponding version of the entry that the system has stored. That first value would have at least two fields:

(1) authkey: a public key; and
(2) sequence: a sequence number, in which 0 is the initial value.

The system would refuse to delete such entries, and would allow them to be overwritten only with values that have three fields with the following three properties:

(1) authkey: the same public key as that of the first value described above.
(2) sequence: a value greater than the "sequence" in the value being overwritten.
(3) signature: a signature of all fields other than "signature", signed with the secret key corresponding to "authkey".

If an updated entry does not satisfy the properties above, the system may reject the entry. Alternatively, several versions of an entry may be stored in various locations of the system. If so, then when garbage collection is applied to an entry's directed acyclic graph (DAG), the system may keep only the version of the entry in the DAG whose value matches the hash embedded in the lookup key, and it may discard other entries. This allows new joining members to verify that newer values have been signed by the "authkey" key tied to the lookup key.

If a conflict were found in the entry's DAG, the system may select the version having the highest sequence number and discard entries with lower sequence numbers.

Thus, in this option, an application wishing to write a sequence of values at a given lookup key first creates a public-key pair. The application will append the hash of its first value to the lookup key, as in the "immutable entries" scheme. Subsequent values are then signed with the secret key.

If multiple devices (perhaps associated with the same person or organization) wish to write to the same lookup key, the devices will share the secret key corresponding to the "authkey" key. In this embodiment, only such devices may be able to resolve conflicts.

These entries cannot be deleted, but to achieve a similar effect, the writer would overwrite the value with a minimal entry that would cause readers to ignore it.

Authenticated, single-writer entries.

The third option, authenticated, single-writer entries, are values that can be written by any sync group member with write access and that specifies a blessing pattern. Any member with write access that wields a blessing matching the pattern may also write. The blessing pattern may not be changed once set. This technique builds on the second option (unauthenticated, single-writer entries) by using a blessing name and certificate chain instead of an unauthenticated public key.

In this option, the system will recognize entries whose lookup keys end in "$hash=<hash_of_value>$", where "<hash_of_value>" is a cryptographic hash of the first value stored in the entry. The first value would include at least four fields:
  (1) author: a blessing pattern of the original author.
  (2) re_signer: a blessing pattern of a trusted re-signer, who may sign for the original author.
  (3) sequence: a sequence number, in which 0 is the initial value.
  (4) signature: a signature of all fields other than "signature", signed with a signing blessing matching "author".

The system may refuse to accept entries that do not have such fields, and it may allow existing entries to be overwritten only with values that have the following fields and properties:
  (1) author: the same blessing pattern as in the "author" field of the previous value described above.
  (2) re_signer: the same blessing pattern as in the "re_signer" field of the previous value.
  (3) sequence: either:
    a. a value greater than the "sequence" in the value being overwritten if the signature is by "author", or
    b. the same value as that previous "sequence", providing that all fields except "signature" have the same value as in the previous value and the signature is by "re_signer".
  (4) signature: a signature of all fields other than "signature", signed with a signing blessing matching either "author" or "re_signer".

When garbage collection is applied to the entry's DAG, the system may discard entry versions other than the one whose value matches the hash embedded in the lookup key. This allows new joining storage service agents to verify that newer values have been signed by the "author" tied to the lookup key.

If a conflict were found in the entry's DAG, the system may select the entry having the highest sequence number. Between two values with the same sequence number, the system may select values signed by "re-signer" over values signed by "author"; such values may otherwise be identical.

The designated "re-signer" in this option exists to allow key roll over. It will re-sign values signed by the author, and periodically re-sign values it has previously signed to prevent expiry of any of the signature, blessing, or key. Any application handling long-lived data may use such a re-signer, and it may designate a server member of the sync group for that role. The application may give the server a re-signing blessing, tell the server how often to refresh its signatures, and optionally also designate which prefixes should be re-signed to avoid the server having to search the entire collection.

If a signature of an entry has expired, the system may reject Put( ) calls with otherwise valid "signature" fields that have expired or will expire before the data will reach the rest of the sync group. The system may nevertheless accept otherwise valid but expired "signature" fields when receiving values via the sync protocol. This may help discourage the introduction of expired signatures, and yet if an entry with an expired signature is created multiple sync group members may see a consistent view of the same expired entry. The garbage collection code may include instructions to keep the last unexpired value (if there is one) to help the re-signer repair the situation. The conflict resolution code also may include a rule to give preference to unexpired entries over expired entries. Optionally, the re-signer could re-sign expired "author" signatures if they meet specified criteria, or the re-signer may remove expired entries or replace them with earlier, unexpired entries.

With this option, a device wishing to write a sequence of values at a given lookup key may be required to append the hash of its first value to the lookup key, as in the "immutable entries" scheme, and it may be required sign with a signing blessing matching "author". All subsequent values may then be signed with such a blessing, or re-signed by the re-signer.

Assuming the writer and re-signer do not allow signatures to expire, a device that reads an entry will be able to tell which blessing (pattern) was responsible for the writes.

These entries cannot be deleted, but to achieve a similar effect, the writer would overwrite the value with a minimal entry that would cause readers to ignore it.

This option may not restrict which device performs the first write to any given lookup key. But it will help ensure that subsequent writes to the same lookup key are authorized by the initial author.

Optionally, only the initial author may be allowed to resolve conflicts. The system also may give the re-signer that ability.

Optionally, either or both of the "author" and "re_signer" fields could hold a list of blessing patterns, rather than single blessing pattern. Also optionally, the re-signer may be permitted to change the "author" field, to accommodate changes in who may write.

Optionally, the "author" and "re_signer" fields may refer to ACL group names.

As described above, the re-signer would be a read/write member of the sync group. Some embodiments may allow the re-signer to be a read-only member of the sync group. If so, the system would relax the rules about how members accept values from read-only members. The re-signer would then re-sign only values that are identical to some previous value written another entity.

Access-controlled entries.

The fourth option, authenticated, single-writer entries, are values that can be written only by some sync group member with write access to the collection, and who wields a blessing matching a blessing pattern of the entry's lookup key. This technique builds on authenticated, single-writer entries by including a blessing pattern in the lookup key, instead of including a hash value in the lookup key.

In this option, the system may only accept entries (including original entries and updates to existing entries) whose lookup keys contain "$writer=<blessing_pattern>$". The system may refuse to delete existing versions of such entries, and it may allow them to be written only with values that have the following fields and properties:
  (1) re_signer: a blessing pattern of a trusted re-signer, who may sign for the original author.
  (2) sequence: one of the following:
    a. 0 if this is the initial value,
    b. a value greater than the "sequence" in the value being overwritten if the signature is by "author", or
    c. the same value as the previously-described "sequence", providing all fields except "signature" have the same value as in the previous value if the signature is by "re_signer".
  (3) signature: a signature of all fields other than "signature", signed with a signing blessing matching either <blessing_pattern> or "re_signer".

If a conflict is found in the entry's DAG, the system may choose the version with the highest sequence numbers, other things being equal. Between two values with the same sequence number, the system may choose values signed by "re_signer" over values signed by "author", other things being equal.

The designated "re_signer" may enable key roll over. It may re-sign values signed by the author, and periodically re-sign values it has previously signed to prevent expiry of any of the signature, blessing, or key. Any application handling long-lived data may use such a re-signer, and the application may designate a server member of the sync group for that role; the application may give the server a re-signing blessing, tell the server how often to refresh its signatures, and optionally also designate which prefixes should be re-signed to avoid the server having to search the entire collection.

If a signature of an entry has expired, the system may reject Put( ) calls with otherwise valid "signature" fields that have expired or will expire before the data will reach the rest of the sync group. The system may nevertheless accept otherwise valid but expired "signature" fields when receiving values via the sync protocol. This may help discourage the introduction of expired signatures, and yet if an entry with an expired signature is created multiple sync group members may see a consistent view of the same expired entry. The garbage collection code may include instructions to keep the last unexpired value (if there is one) to help the re-signer repair the situation. The conflict resolution code also may include a rule to give preference to unexpired entries over expired entries. Optionally, the re-signer could re-sign expired "author" signatures if they meet specified criteria, or the re-signer may remove expired entries or replace them with earlier, unexpired entries.

With this option, a device wishing to write a sequence of values at a given lookup key would place a blessing pattern into the lookup key, and it would sign the object with a signing blessing matching that pattern. All subsequent values may be signed by the device (or the re-signer) with such a blessing.

If the writer and re-signer do not allow signatures to expire, readers of an object will be able to tell which blessing (pattern) was responsible for the writes, and will know no other members could have written values at the relevant lookup keys.

Optionally, these entries may not be deleted, but to achieve a similar effect, the writer may overwrite the value with a minimal entry that would cause readers to ignore it.

In this option, either or both of the <blessing_pattern> and "re_signer" fields could hold a list of blessing patterns, rather than a single blessing pattern. The <blessing_pattern> and "re_signer" fields could also refer to ACL group names.

In this embodiment, only members matching <blessing_pattern> may be allowed to resolve conflicts. Optionally, the re-signer may also be given this ability.

Optionally, the "re_signer" pattern could be encoded in the lookup key, rather than being in a field.

Optionally, the DAG garbage collection algorithm may keep every node signed by <blessing_pattern> with a successor signer by "re_signer". If done, this may help verify that the "re_signer" has not overstepped its authority (by writing new data) while the author's key remains uncompromised.

As described, the re-signer would be a read/write member of the sync group. In some embodiments, the re-signer may be a read-only member, in which the system would relax the rules about how members accept values from read-only members. This could be done by permitting the re-signer to re-sign only values that are identical to some previous value written by someone else.

Figure 6:
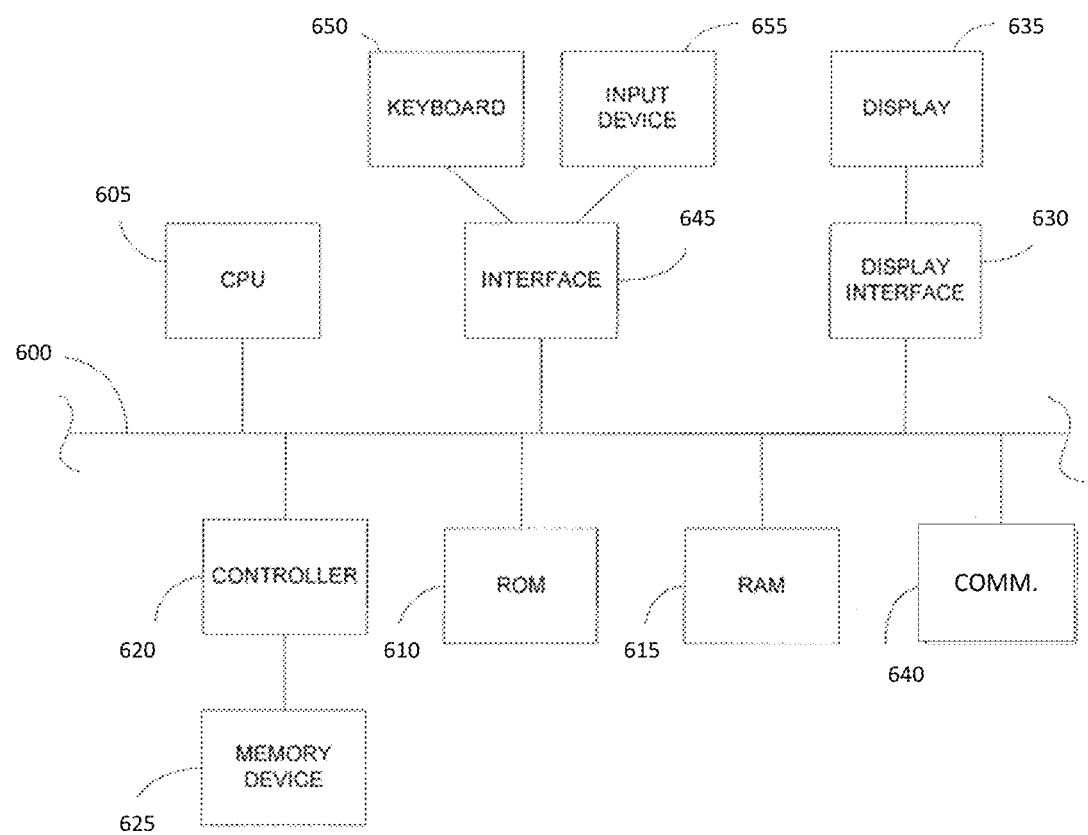
FIG. 6 is a block diagram of example hardware that may be used to contain or implement program instructions and communication with other devices according to various embodiments.

FIG. 6 depicts a block diagram of hardware that may be used to contain or implement program instructions, such as a server or other electronic device. A bus 600 serves as an information highway interconnecting the other illustrated components of the hardware. Processor (CPU) 605 is a central processing device of the system, performing calculations and logic operations required to execute a program. CPU 605, alone or in conjunction with one or more of the other elements disclosed in FIG. 6, is an example of a processing device, computing device or processor as such terms are used within this disclosure. Read only memory (ROM) 610 and random access memory (RAM) 615 constitute examples of memory devices.

A controller 620 interfaces with one or more optional non-transitory computer-readable storage media (i.e., memory device 625) to the bus 600. These storage media may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on the storage media 625 discussed above.

An optional display interface 630 may permit information from the bus 600 to be displayed on the display 635 in audio, visual, graphic or alphanumeric format. Communication with external devices, such as a printing device, may occur using various communication elements 640, such as a communication port or antenna. A communication element 640 may be communicatively connected to a communication network, such as the Internet or an intranet.

The hardware may also include an interface 645 which allows for receipt of data from input devices such as a keyboard 650 or other input device 655 such as a mouse, a touch pad, a touch screen, a remote control, a pointing device, a video input device and/or an audio input device.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of validating an object shared between electronic devices comprising:
   receiving a data object by a first device at a first time, the first device authorized to receive the object,
   determining, by the first device, that the received data object is valid, comprising determining whether the data object includes one or more signatures of at least one other device authorized to receive the data object, wherein the one or more signatures of the data object are valid within a predetermined grace period from the first time; and
   in response to determining by the first device that the received data object is valid, sending the validated signed object to one or more second devices.

2. The method of claim 1, wherein the method further comprises:
   before sending the validated signed object to the one or more second devices, updating the validated signed object with a signature corresponding to the first device.

3. The method of claim 1, wherein determining that the received data object is valid further comprises:
for each signature of the one or more signatures, determining, by the first device, whether the signature is a valid signature of a respective device authorized to receive the data object; and
in response to determining that the signature is not a valid signature of a respective device authorized to receive the data object, requiring the respective device to provide an updated validated signed object with the valid signature of the respective device.

4. The method of claim 1, wherein the data object is represented as a row in a batch of data objects, each data object in the batch being an updated version of data objects locally stored at the first device, wherein the method further comprises:
receiving the batch of data objects;
determining whether any row in the batch is in conflict due to a difference between a respective locally stored data object stored on the first device and a data object in a respective row of the batch; and
for any row that is determined to be in conflict, adding the row to a closure.

5. The method of claim 4, wherein the batch is a first batch, and wherein determining whether any row in the batch is in conflict comprises:
determining whether data representing a first data object in a row in the first batch is different from data representing the first data object in a row for a second batch, wherein the second batch is received from a device that has not received the first batch.

6. The method of claim 5,
wherein the closure includes a plurality of batches, wherein each batch includes at least one row in conflict with a row for another batch in the closure; and
wherein the method further comprises:
determining whether the first device is authorized to resolve conflicts between rows in the closure; and
in response to determining that the first device is authorized to resolve conflicts, resolving the conflict according to predetermined parameter values for conflict resolution between rows.

7. The method of claim 1, wherein determining that the respective signatures of the object are valid comprises determining that the respective signatures of the object are signed by electronic devices with respective keys that are valid as of the predetermined grace period.

8. The method of claim 1, further comprising:
receiving, by the first device, an entry to a data store that comprises the received data object and a lookup key generated by a device different from the first device;
determining whether the lookup key for the entry ends in a value that matches a cryptographic hash of a corresponding entry of an immutable data object that is stored in the data store; and
accepting the entry only if the lookup key for the entry ends in the value, otherwise rejecting the entry.

9. The method of claim 8, wherein the value includes:
a blessing pattern of the first device;
a blessing pattern of a trusted re-signer;
a sequence number; and
a signature of the first device.

10. The method of claim 1, further comprising:
receiving, by the first device, an entry that comprises the received data object and a lookup key generated by a device different from the first device;
determining whether the lookup key for the entry includes a blessing pattern of a trusted re-signer; and
only accepting the entry if the lookup key for the entry includes the blessing pattern of the trusted re-signer, otherwise rejecting the entry.

11. A system of electronic devices, comprising:
one or more second devices; and
a first device comprising at least one or more hardware processors and memory configured to:
receive a data object at a first time, the first device authorized to receive the object,
determine that the received data object is valid, comprising determining whether the data object includes one or more signatures of at least one other device authorized to receive the data object, wherein the one or more signatures of the data object are valid within a predetermined grace period from the first time, and
in response to determining that the received data object is valid,
send the validated signed object to the one or more second devices.

12. The system of claim 11, wherein the first device is further configured to:
before sending the validated signed object to the one or more second devices, update the validated signed object with a signature corresponding to the first device.

13. The system of claim 11, wherein the data object is represented as a row in a batch of data objects, each data object in the batch being an updated version of data objects locally stored at the first device, wherein the first device is further configured to:
receive the batch comprising a plurality of updated objects;
determine whether any row in the batch is in conflict due to a difference between a respective locally stored data object stored on the first device and a data object in a respective row of the batch; and
for any row that is determined to be in conflict, add the row to a closure.

14. The system of claim 13, wherein the batch is a first batch, and wherein determining whether any row in the batch is in conflict comprises:
determine whether data representing a first data object in a row in the first batch is different from data representing the first data object in a row for a second batch, wherein the second batch is received from a device that has not received the first batch.

15. The system of claim 14,
wherein the closure includes a plurality of batches, wherein each batch includes at least one row in conflict with a row for another batch in the closure; and
wherein the first device is further configured to:
determine whether the first device is authorized to resolve conflicts between rows in the closure; and
in response to the determination that the first device is authorized to resolve conflicts, resolve the conflict according to predetermined parameter values for conflict resolution between rows.

16. The system of claim 11, wherein determining that the respective signatures of the object are valid comprises determining that the respective signatures of the object are signed by electronic devices with respective keys that are valid as of the predetermined grace period.

17. The system of claim 11, wherein the first device is further configured to:

receive an entry to a data store that comprises the received data object and a lookup key generated by a device different from the first device;

determine whether the lookup key for the entry ends in a value whose hash matches a cryptographic hash of a corresponding entry of an immutable data object that is stored in the data store; and accept the entry only if the lookup key for the entry ends in the value, otherwise reject the entry.

18. The system of claim 17, wherein the value includes:
a blessing pattern of the first device;
a blessing pattern of a trusted re-signer;
a sequence number; and
a signature of the first device.

19. The system of claim 11, wherein the first computing device is further configured to:

receive an entry that comprises the received data object and a lookup key generated by a device different from the first device;

determine whether the lookup key for the entry includes a blessing pattern of a trusted re-signer; and accept the entry only if the lookup key for the entry includes the blessing pattern of the trusted re-signer, otherwise reject the entry.

20. One or more non-transitory computer-readable storage media encoding instructions that when executed by a first device comprising one or more processors, causes the first device to perform operations comprising:

receiving a data object at a first time, the first device authorized to receive the object, determining that the received data object is valid, comprising determining whether the data object includes one or more signatures of at least one other device authorized to receive the data object, wherein the one or more signatures of the data object are valid within a predetermined grace period from the first time; and in response to determining by the first device that the received data object is valid: sending the validated signed object to one or more second devices.

* * * * *